Oct. 30, 1923.
M. C. FRINS ET AL
1,472,360
BRAKE RIGGING FOR RAIL CARS
Filed March 9, 1922 2 Sheets-Sheet 1
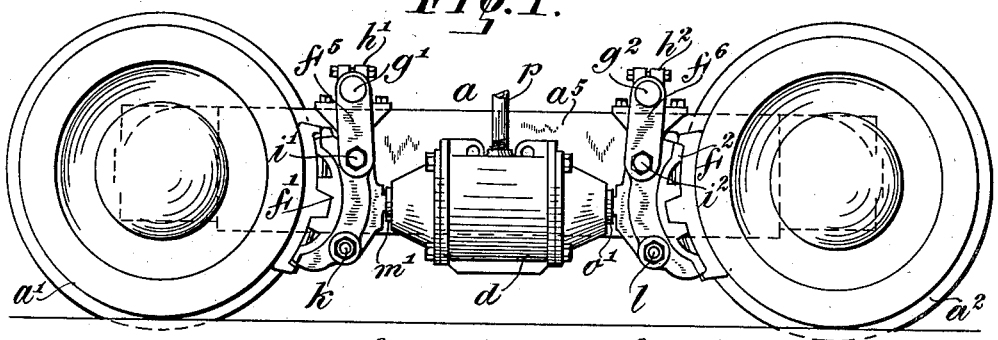
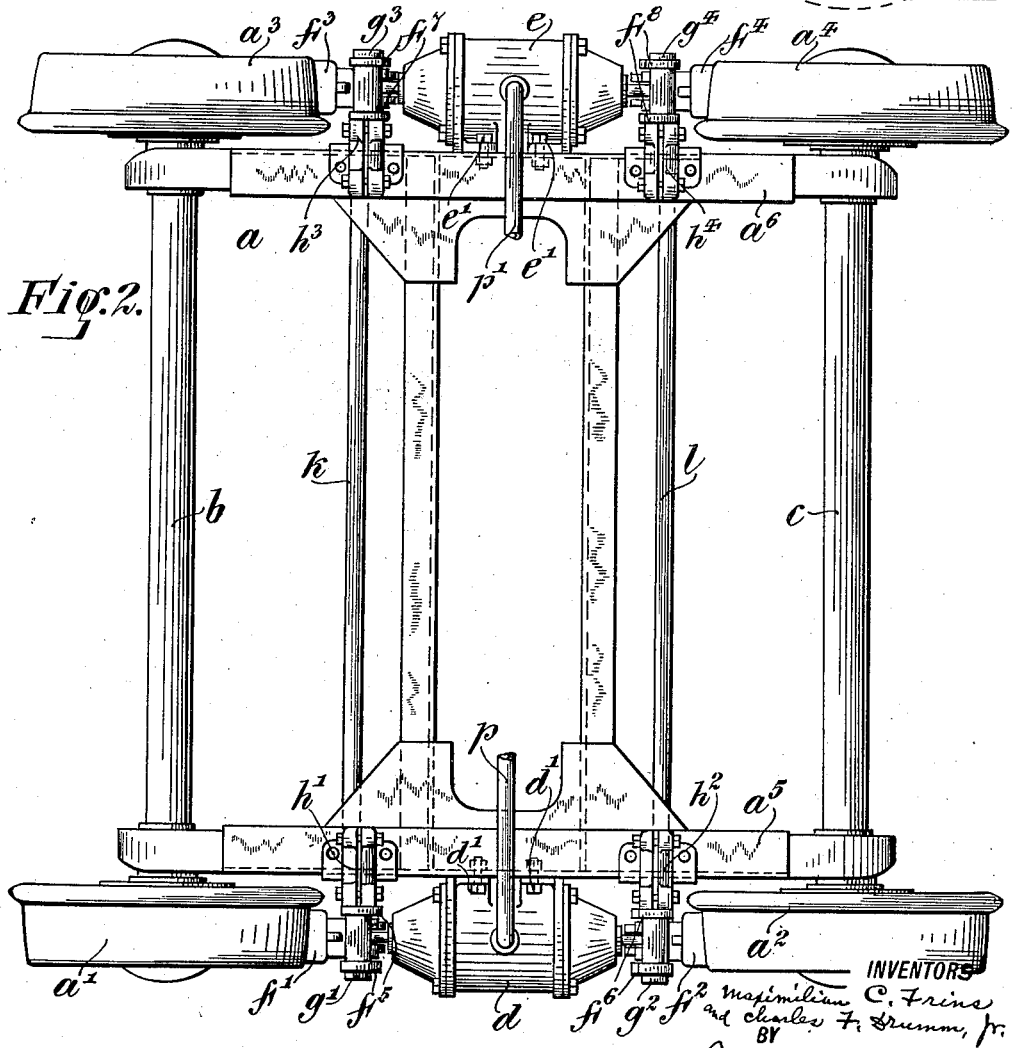

Patented Oct. 30, 1923.

1,472,360

UNITED STATES PATENT OFFICE.

MAXIMILIAN C. FRINS AND CHARLES F. DRUMM, JR., OF NEW YORK, N. Y., ASSIGNORS TO INTERNATIONAL MOTOR COMPANY, OF NEW YORK, N. Y., A CORPORATION OF DELAWARE.

BRAKE RIGGING FOR RAIL CARS.

Application filed March 9, 1922. Serial No. 542,232.

*To all whom it may concern:*

Be it known that we, MAXIMILIAN C. FRINS and CHARLES F. DRUMM, Jr., citizens of the United States, respectively residing in the borough of Manhattan and in the borough of Queens of the city of New York, in the State of New York, have invented certain new and useful Improvements in Brake Rigging for Rail Cars, of which the following is a specification, reference being had to the accompanying drawings, forming a part hereof.

The present invention has for its object to provide a brake rigging in which are employed air brakes, which shall lend itself readily to convenient and effective application to and operation on the bogey truck of a rail car. The invention is designed primarily with reference to its application to rail cars propelled by an internal combustion engine, although it will be evident as the description proceeds that it is not to be so limited. More particularly, the invention seeks to provide such a rigging which shall be of simple construction, invariable in operation, and capable of applying uniform braking pressures per unit area to all of the wheels of the bogey truck both on a straight-away and a curved track. In accordance with the invention it is proposed to provide air cylinders at opposite sides of the truck and directly between two wheels on a side, respectively, and mount oppositely moving pistons in the cylinders to which are pivoted rods connected directly to the respective brake shoes. The cylinders are themselves supplied with air at the same pressure so that the unit pressure on each of the four pistons, in any pair of cylinders, is uniform and the braking pressure of any of the four brake shoes of a set is the same. This uniformity of application is further facilitated by means of transverse tie rods extending transversely between the brake shoes which operate on corresponding wheels at opposite sides of the truck.

A further feature of the invention has to do with what may be termed the flexible mounting of the brake shoes and the flexible connections between them and the respective operating pistons whereby the pressure is applied uniformly throughout the surface of the shoe and the shoe adapts itself automatically to the wheel tread without the imposition of unbalanced stresses.

The invention will be described with reference to one suitable embodiment thereof as illustrated in the drawings wherein:

Figure 1 is a view in side elevation of a bogey truck showing so much of the improved rigging as is applied to two of the wheels on one side of the truck.

Figure 2 is a view in plan of a four wheel bogey truck showing the improved brake rigging.

Figure 3:
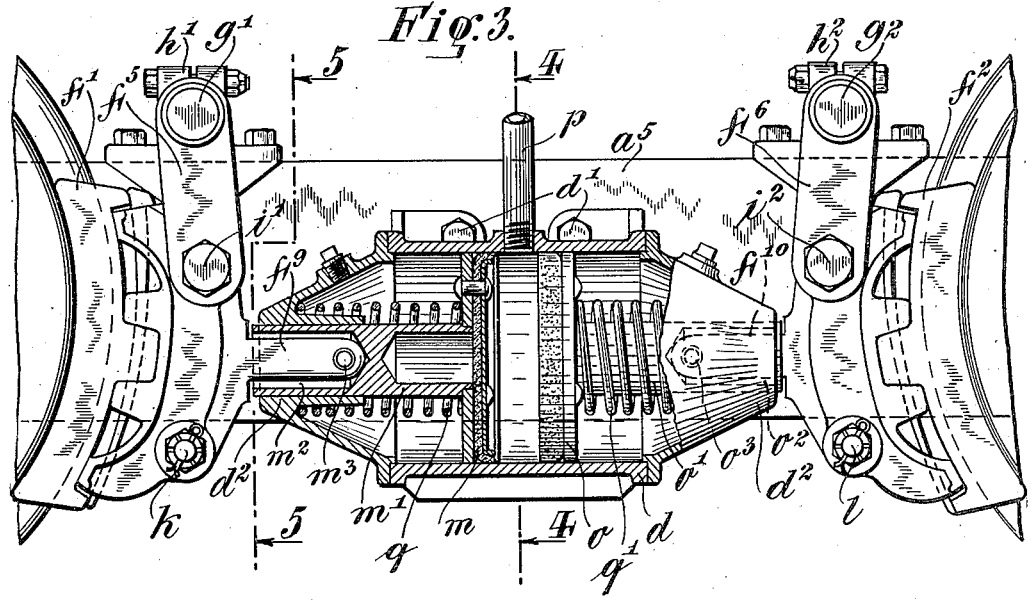
Figure 3 is a view on a somewhat larger scale, partly in side elevation and partly in vertical section, and showing particularly the internal construction of one of the air cylinders at one side of the truck.
Figure 4:
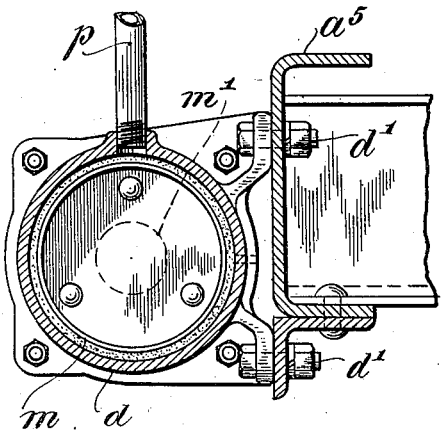
Figure 5:
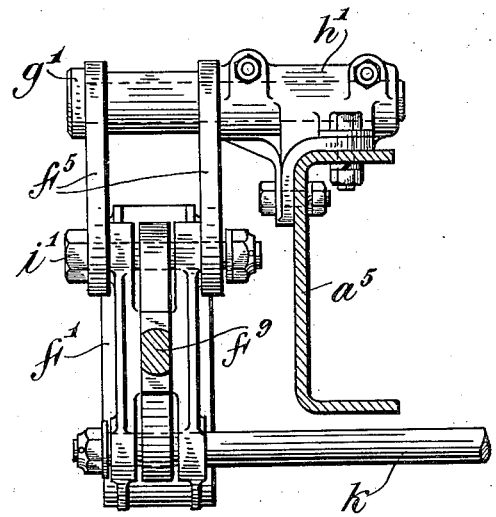

Figures 4 and 5 are detailed views in section taken on the planes indicated by the lines 4—4 and 5—5 in Figure 3 and looking in the direction of the arrows.

The bogey truck indicated generally at $a$ in Figure 2 is of conventional form adapted for application to the front end of the chassis of a rail car propelled by an internal combustion engine. It will be understood that a suitable bolster will be mounted on the bogey truck $a$ and support the chassis through suitable vehicle springs and a swiveled connection by which the truck may adapt itself to curves in the track in accordance with known practice. The invention is not to be limited to the details of construction of the truck $a$ nor to the number of wheels $a'$, $a^2$, $a^3$, $a^4$, provided there for but for the purposes of this application it is convenient to illustrate two axles $b$, $c$, on the opposite ends of which are mounted wheels $a'$, $a^3$, and $a^2$, $a^4$, respectively. The general object of the present invention is to provide a brake rigging, including air brakes, for the four wheels, which shall be of simple construction and insure the application of uniform pressures per unit area to all of the four wheels. In accomplishing this result there are mounted at opposite sides of the truck $a$ air cylinders $d$, $e$, directly between the respective wheels $a'$, $a^2$, and $a^3$, $a^4$, and with their axes in such relation to such wheels as to insure proper operation of brakes through the instrumentality of said cylinders. Bolts $d'$, $e'$, may be employed to secure the cylinders to the side frame members $a^5$, $a^6$, respectively, of the bogey truck $a$.

The brake shoes $f'$, $f^2$, $f^3$, $f^4$, are hung in operative position with respect to the several wheels $a'$, $a^2$, $a^3$, $a^4$, through links $f^5$, $f^6$, $f^7$, $f^8$, respectively. These links are pivotally supported on pins $g'$, $g^2$, $g^3$, $g^4$, which are journaled removably in split bearings $h'$, $h^2$, $h^3$, $h^4$, bolted on to the side frame members $a^5$, $a^6$, of the truck $a$ in proximity to the respective shoes $f'$, $f^2$, $f^3$, $f^4$. The several shoes $f'$, $f^2$, $f^3$, $f^4$, are pivotally hung on the links $f^5$, $f^6$, $f^7$, $f^8$, respectively, by means of pins $i'$, $i^2$, etc. Extending between the brake shoes $f'$, $f^3$, and between the brake shoes $f^2$, $f^4$, are transverse tie rods $k$, $l$, respectively, whereby the shoes are prevented from tipping and sliding off the wheels.

The brake operating means will now be considered with special reference to Figs. 3 and 4 which show the internal construction of one of the brake cylinders $d$, it being understood that the other brake cylinder $e$ is similarly constructed and its parts disposed in similar operating relation to the brake shoes between which it is disposed. The cylinder $d$ has disposed therein opposed pistons $m$, $o$, of equal areas and movable in opposite directions under the pressure of air admitted therebetween through the supply pipe $p$. These pistons have secured rigidly thereto stems $m'$, $o'$, respectively, which are journaled slidably in extended bearing sleeves $d^2$ cast in the end walls of the air cylinder. The pistons are thus guided in their movements and held against any distortion or jamming. However, they are pivotally connected to the respective brake shoes $f'$, $f^2$, in order that the shoes may conform to the wheels and apply pressure thereto uniformly through the contacting surfaces. The outer ends of the stems $m'$, $o'$, of the pistons are bored out as at $m^2$, $o^2$, to receive the rigid arms $f^9$, $f^{10}$, of the respective shoes $f'$, $f^2$, these arms being pivotally connected to the respective stems as at $m^3$, $o^3$. The clearance between the arms $f^9$, $f^{10}$, and the walls of the stems $m'$, $o'$, which they enter is sufficient to permit such angular movement therebetween as may be necessary for adaptation of the shoes to the curved treads of the wheels, having in mind that the shoes are pivotally hung from the pins $i'$, $i^2$. Springs $q$, $q'$, which may be of spiral form may encircle the extended bearing sleeves $d^2$, etc., and seat on the opposite end walls of the cylinder $d$ and press against the rear sides of the respective pistons $m$, $o$, so as to normally force them towards the mid-section of the cylinder and hold the brakes released.

Air is supplied to the cylinder $e$ at the other side of the truck through a pipe $p'$ which is connected to a source of air supply in common with the pipe $p$ so that air at the same pressure may be applied simultaneously to the two cylinders $d$, $e$.

In operation, when air is admitted to the two cylinders $d$, $e$, and between the opposed pistons disposed movably therein, as exemplified by the pistons $m$, $o$, these pistons will move outwardly against the action of their respective restraining springs, such as $q$, $q'$, and the brake shoes will be directly applied. The shoes are disposed in the same vertical planes as the axis of the respective air cylinders and the forces applying the brakes operate in these planes and directly on the shoes. Uniform application of all the brake shoes with an equal pressure per unit area is insured by the construction described and by the pivotal connection between the respective pistons and shoes as exemplified by the pins $m^3$, $o^3$.

The scope of the invention will appear from the appended claim.

What we claim is:

A brake rigging for a bogey truck, comprising a brake cylinder located between a pair of wheels on one side of the truck, opposite ends of the cylinder being provided with an elongated bearing extending inwardly of the cylinder for a substantial distance, a pair of piston rods slidable in the elongated bearings, respectively, the outer ends of the piston rods being hollowed out, an arm pivoted at the inner end of each hollowed out portion, a brake shoe directly connected with said arms, and links, pivoted to each brake shoe and to the frame of the truck, for supporting the brake shoes.

This specification signed this 7th day of March, A. D. 1922.

MAXIMILIAN C. FRINS.
CHARLES F. DRUMM, Jr.